United States Patent
Bullis et al.

(10) Patent No.: US 6,876,664 B1
(45) Date of Patent: Apr. 5, 2005

(54) ASYNCHRONOUS DATA BUFFER AND A METHOD OF USE THEREOF

(75) Inventors: Bryan Keith Bullis, Apex, NC (US); John Charles Goss, Wendell, NC (US); Robert Brian Likovich, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/541,773

(22) Filed: Apr. 3, 2000

(51) Int. Cl.$^7$ ............................................. H04L 12/56
(52) U.S. Cl. ..................................... 370/429; 370/412
(58) Field of Search ........................... 370/232, 235, 370/395.1, 412, 413, 415, 428, 429, 465

(56) References Cited

U.S. PATENT DOCUMENTS

| | | | | |
|---|---|---|---|---|
| 5,210,749 A | * | 5/1993 | Firoozmand | 370/463 |
| 5,303,302 A | * | 4/1994 | Burrows | 713/161 |
| 5,361,255 A | | 11/1994 | Diaz et al. | |
| 5,483,671 A | * | 1/1996 | Helm et al. | 455/503 |
| 5,548,624 A | | 8/1996 | Yoshida | |
| 5,781,598 A | | 7/1998 | Hardy, III | |
| 5,787,073 A | | 7/1998 | Ikeda | |
| 5,790,538 A | | 8/1998 | Sugar | |
| 6,115,387 A | * | 9/2000 | Egbert et al. | 370/423 |
| 6,138,189 A | * | 10/2000 | Kalkunte | 710/53 |
| 6,151,321 A | * | 11/2000 | Benson et al. | 370/395.42 |
| 6,377,541 B1 | * | 4/2002 | Boetzel | 370/216 |
| 6,434,161 B1 | * | 8/2002 | Higbee et al. | 370/413 |

* cited by examiner

Primary Examiner—John Pezzlo
Assistant Examiner—Ahmed Elallam
(74) Attorney, Agent, or Firm—Sawyer Law Group LLP

(57) ABSTRACT

An improved asynchronous data buffer is disclosed. The data buffer comprises an entry section and a signaling circuit coupled to the entry section, the signaling circuit for signaling the data buffer to transfer a portion of a data cell from the entry section prior to the data cell being completely received by the entry section. Through the use of the data buffer in accordance with the present invention, data transfer systems are improved in two ways. Firsts by enabling data to be transferred before it is completely stored into the buffer, the latency that is typically required for data cell transfer is reduced. Second, the buffer storage space that is typically required to store a complete data cell is also reduced. This twofold improvement produces increased data transfer rates while decreasing the amount of required buffer storage space.

14 Claims, 3 Drawing Sheets

ASYNCHRONOUS DATA BUFFER AND A METHOD OF USE THEREOF

FIELD OF THE INVENTION

The present invention relates generally to network data transfer systems and specifically to an asynchronous data buffer and a method of use thereof.

BACKGROUND OF THE INVENTION

Many conventional network data transfer systems utilize cell relay systems to transfer data. The objective of cell relay systems is to develop a single high-speed network based on a switching and multiplexing scheme that works for all data types. Cell relay is a generic term for a packet switching protocol using fixed length packets or cells. A packet or cell is a bundle of data, usually in binary form, organized in a specific way for transmission.

A network data transfer system ordinarily involves a sending device and a receiving device. However, because the sending device usually has a different data rate/flow than the receiving device, data buffers typically are utilized. A buffer is a temporary storage location for information being sent or received and is located between two different devices that have different rates for handling the data. FIG. 1 is an example of a typical data transfer environment. This environment includes a sending device 10, a buffer 12, and a receiving device 14. The buffer 12 includes a write element 11 for writing data cells into the buffer 12 from the sending device 10 and a read element 13 for reading data cells from the buffer 12 to the receiving device 14. Basically, the buffer acts like a dam. It captures the data cells from the sending device 10 and then sends them out at a rate that can be handled by the receiving device 14.

However, conventional systems require that each data cell being transferred be completely written into the buffer 12 before it can be read out. A problem with this type of implementation is the latency involved during data transfer. Latency is the time elapsed from when the data cell first enters the system to when the data cell begins to leave the system. Another problem with the conventional implementation is the larger amount of buffer space needed to prevent over and under runs.

Accordingly, what is needed is a smaller data buffer that reduces latency during data transfer. The present invention addresses such a need.

SUMMARY OF THE INVENTION

A data buffer in accordance with the present invention is disclosed. The data buffer comprises an entry section and a signaling circuit coupled to the entry section, the signaling circuit for signaling the data buffer to transfer a portion of a data cell from the entry section prior to the data cell being completely received by the entry section.

Through the use of the data buffer in accordance with the present invention, data transfer systems are improved in two ways. First, by enabling data to be transferred before it is completely stored into the buffer, the latency that is typically required for data cell transfer is reduced. Second, the buffer storage space that is typically required to store a complete data cell is also reduced. This two-fold improvement produces increased data transfer rates while decreasing the amount of required buffer storage space.

DETAILED DESCRIPTION

The present invention discloses a data buffer. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
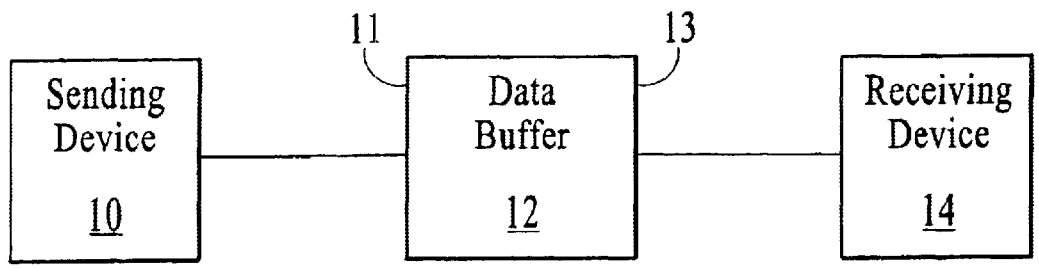
FIG. 1 is an example of a typical data transfer environment.
Figure 2:
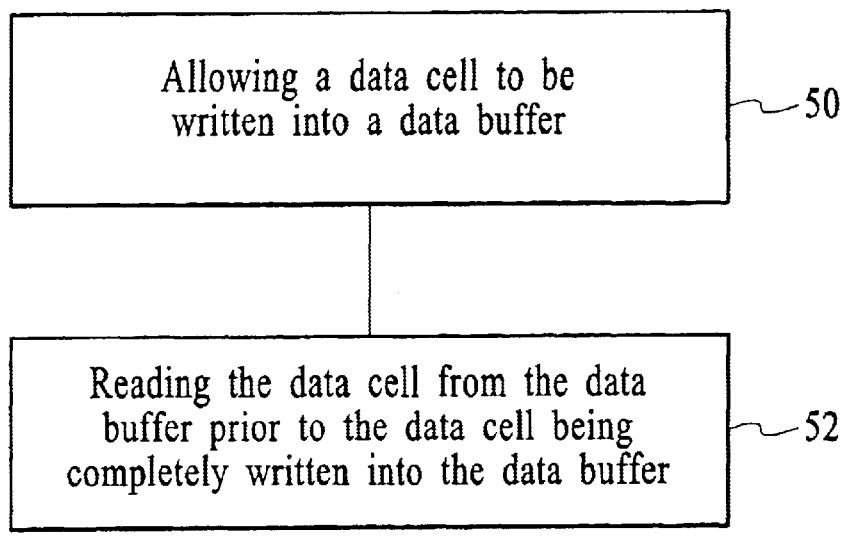
FIG. 2 is a high level flowchart of the method of the present invention.

To more particularly describe the method accordance with the present invention, FIG. 2 is a simple flowchart of a method in accordance with the present invention. First, data from a data cell is allowed to be written into the data buffer, via step 50. Next, the data cell is read from the data buffer prior to the data cell being completely written into the data buffer, via step 52.

The present invention is presented in the context of a preferred embodiment. The preferred embodiment of the present invention provides an improved asynchronous data buffer. Through the use of the data buffer in accordance with the present invention, data cell transfer latency is reduced. Furthermore, the amount of required buffer storage space is decreased since the buffer storage space that is typically required to store a complete data cell is reduced.

The asynchronous data buffer in accordance with the present invention operates on the premise that programmable data transfer threshold settings can be established in order to allow a data cell to begin being read out of the data buffer prior to the entire data cell being written into the data buffer. Furthermore, the data buffer in accordance with the present invention allows another cell to be written in even if the current cell is not completely read. Preferably, these threshold settings are determined based on mathematical algorithms or empirical data related to the data transfer process. However, one of ordinary skill in the art will readily recognize that a variety of methods could be used to determine the threshold settings while remaining within the spirit and scope of the present invention.

As previously shown, a buffer comprises a write element and a read element. Accordingly, the threshold settings are derived based on the knowledge that at a certain point during the data transfer process, the read element can't possibly get ahead of the write element, even if it is running faster. The reverse is true for the write element. After a certain amount of the data cell has been read out of the data buffer, this amount being less than the full amount, the write element can begin writing a subsequent data cell into the buffer with no danger of data corruption.

It should also be noted that the asynchronous operation of the data buffer in accordance with the present invention is not simply limited to equal but out of phase frequencies. The asynchronous data buffer in accordance with the present invention can operate with two distinctly different frequencies. For example, the write side may run at 10 ns, while the read side may run at 8 ns. The decoupling of the read and write sides, along with the communication between the two sides via the asynchronous signaling circuitry allows for this type of flexibility when the threshold settings are properly tuned.

In order to facilitate the method in accordance with the present invention, a read-signal is provided to the data buffer once the data cell being transferred has reached the threshold setting (i.e. before the entire data cell is written into the buffer). Once the read-signal is provided, the data buffer begins reading the partially written data cell out of the data buffer. In addition, as the data cell is being read out of the buffer, a write-signal is provided to indicate that a subsequent data cell can begin being written into the data buffer. Although the write-signal is provided prior to the initial data cell being completely read from the data buffer, the threshold settings are established so that data corruption is avoided. Data being read out of the buffer can be corrupted if a subsequent data cell being written into the buffer "catches up" with the data being read out of the buffer and overwrites it.

Figure 3:
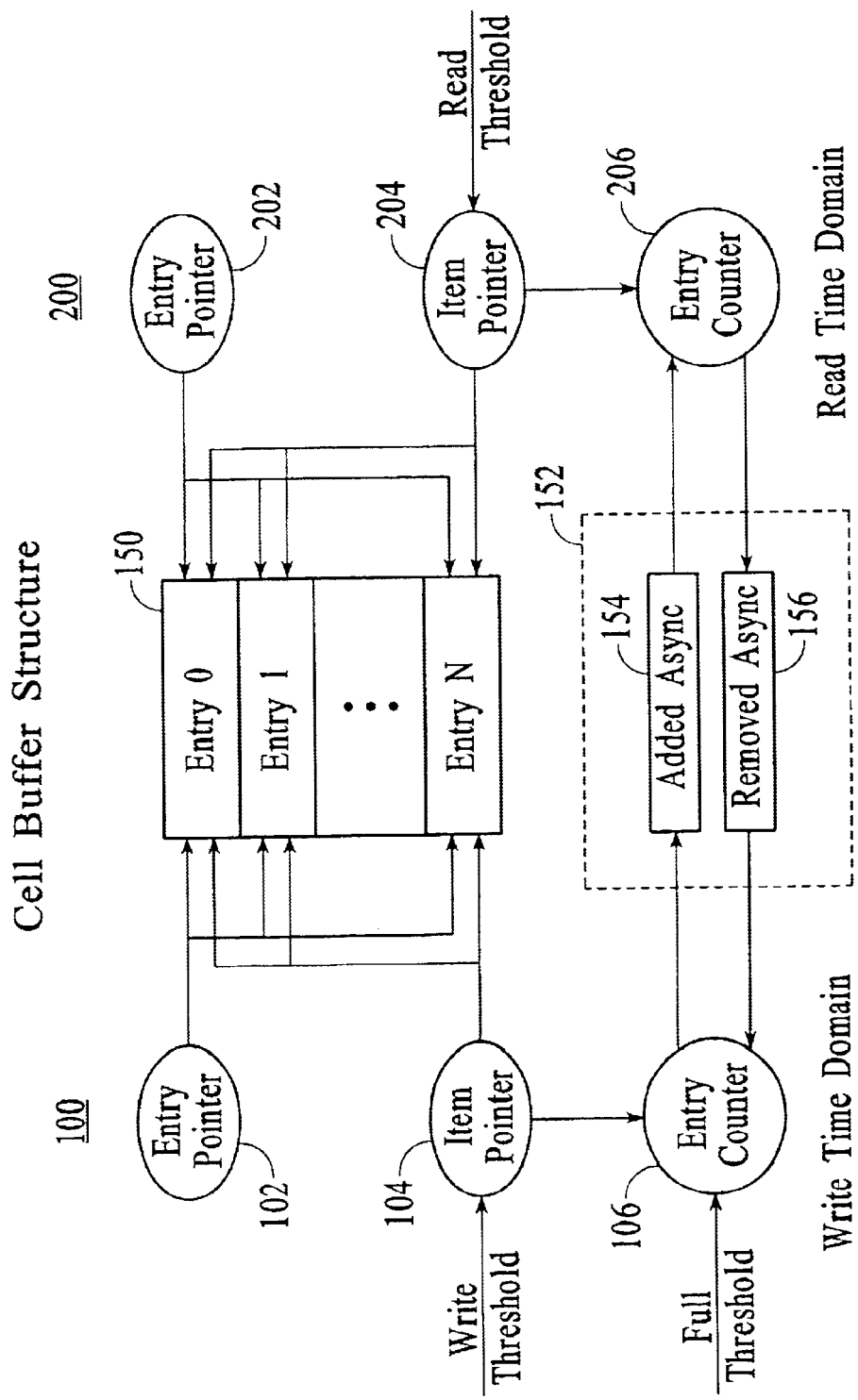
FIG. 3 shows a data buffer in accordance with the present invention.

To better understand the present invention, FIG. 3 shows a data buffer in accordance with the present invention. The data buffer comprises a write element (writer) 100, a buffer entry section 150 and a read element (reader) 200. The writer 100 and the reader 200 comprise similar logic structures. The writer 100 and reader each comprise an entry pointer 102, 202 which indicates which data cell is currently being transferred; an item pointer 104, 204 which indicates which specific portion of the data cell is being transferred; and an entry counter 106, 206 which counts how many data cells have been processed (i.e., the write element's entry counter 106 indicates how many data cells have been written but not read and the read element's entry counter 206 indicates how many data cells are left).

The data buffer in accordance with the present invention also includes an asynchronous circuit 152. The asynchronous circuit 152 includes an "add" signaling portion 154 and a "remove" signaling portion 156 and is employed to allow the writer 100 and reader 200 to communicate with each other. Using conventional methodology, a reader is designed to read a data cell from the buffer entry section only when the data cell has been completely written into the buffer entry section. However, by utilizing the data buffer in accordance with the present invention, data is transferred with a finer granularity.

What is meant by a finer granularity is that the data buffer in accordance with the present invention is programmed to transfer data cells at a byte-access level. What is meant by a byte-access level is that each of a plurality of portions of the data cell are written into the buffer entry section 150 via a byte-access to the buffer entry section 150. For example, 16 byte-accesses to the buffer entry section 150 are required for an entire data cell to be written into the buffer entry section 150. Accordingly, at a predetermined threshold point, i.e. at a point prior to the entire data cell being written into the buffer entry section 150, the reader can't possibly get ahead of the writer. At this predetermined threshold point, for example after the 8th byte-access, the asynchronous circuit 152 provides a signal to the reader 200 to begin reading the data cell.

Although the above outlined description discloses the utilization of a data cell requiring 16 accesses to the buffer entry section wherein the predetermined threshold point is after the $8^{th}$ access, one of ordinary skill in the art will readily recognize that the number of required access for a data cell and the respective predetermined threshold could vary while remaining within the spirit and scope of the present invention.

By transferring cells at a finer granular level (i.e. via byte-access as opposed to whole cell accesses), the asynchronous data buffer can overcome inefficiencies in the control logic of buffers downstream from it. For example, for cell transfers from chip to chip, there is an inherent latency in starting and stopping cell transfers. By generating thresholds on a byte-access level, the full and empty signals are more timely and can thus over come these inefficiencies.

This same concept is also utilized with regard to the writer 100. At another predetermined threshold point prior to the entire data cell being read from the buffer entry section 150, the writer 100 can begin writing a subsequent data cell into the buffer entry section 150 with no danger of corrupting the data being read out of the buffer entry section 150.

Figure 4:
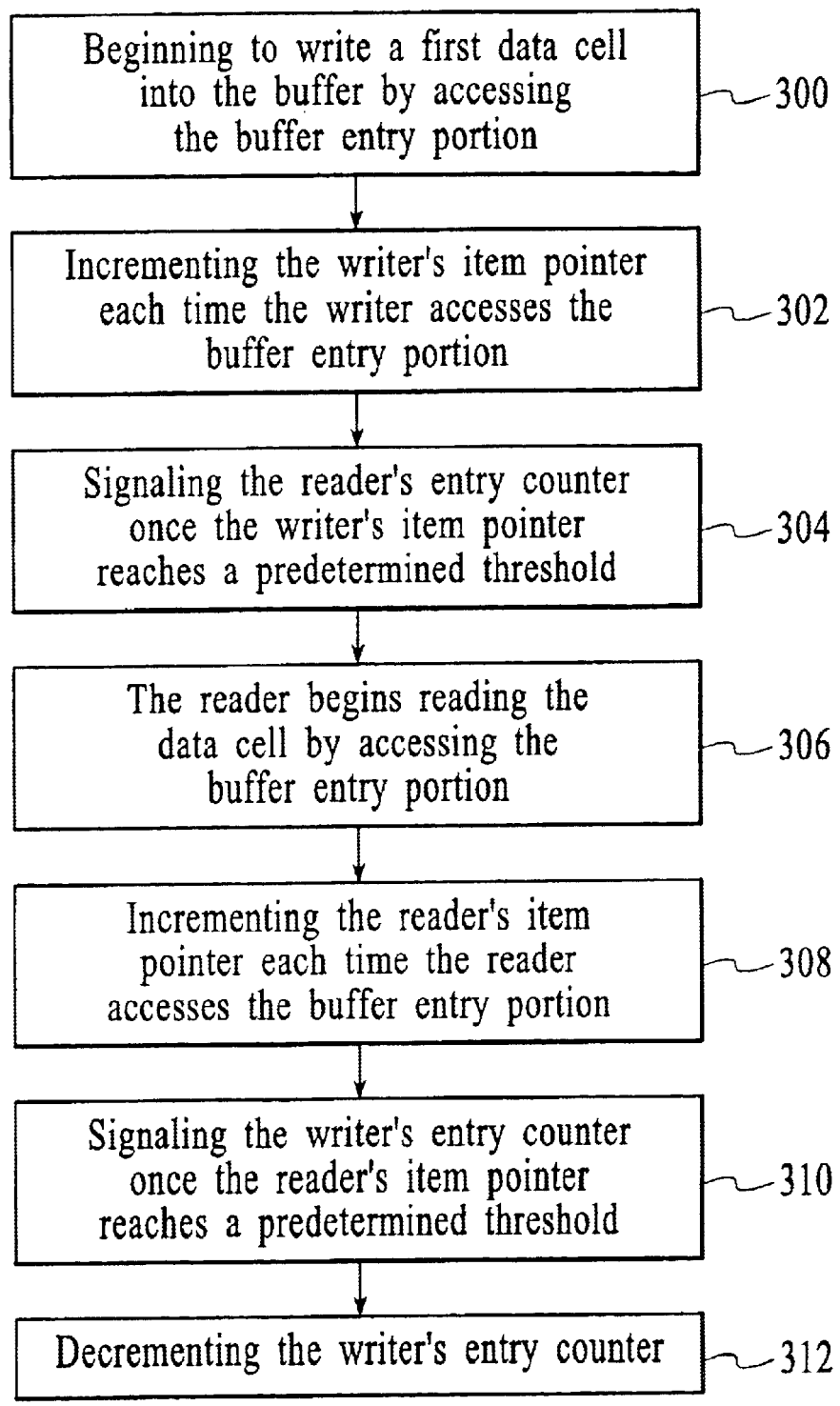
FIG. 4 is a flowchart of the operation of the data buffer in accordance with the preferred embodiment of the present invention.

To better understand the operation of the data buffer in accordance with the present invention, please refer to FIG. 4. FIG. 4 is a flowchart of the operation of the data buffer in accordance with the preferred embodiment of the present invention. The process begins with a number of data cells needing to be written into the buffer entry section. First, the writer begins to write the first data cell into the buffer entry section by accessing the buffer entry section, via step 300. Next, the writer's item pointer is incremented each time the writer accesses the buffer entry section to write the first data cell, via step 302. Once the item pointer reaches a predetermined threshold, the predetermined threshold being set at a point before the first data cell is completely written into the buffer entry section, the asynchronous signaling circuit signals the reader to increment its entry counter, via step 304. This is done via the "add" signaling portion. Preferably, before data is written into the buffer entry section, the reader's entry counter is zero. Accordingly, zero cells are available to be read. Once, the reader's entry counter is non-zero, this indicates that the buffer entry section is non-empty and the reader can begin reading data from the buffer entry section.

Next, the reader begins reading the first data cell from the buffer entry section by accessing the buffer entry section, via step 306. The reader's item pointer is then incremented each time the reader accesses the buffer entry section, via step 308. Once the reader's item pointer reaches a predetermined threshold, the asynchronous signaling circuit signals the writer's entry counter to decrement, via step 310. Preferably, this is done via the "remove" signaling portion of the asynchronous circuit. The writer's entry counter is then decremented, thereby reducing by one the number of data cell entries written, but not read, into the buffer entry section, via step 312. The writer can now begin writing a second data cell entry into the buffer entry section once the first data cell is completely written into the buffer entry section. However, when the total buffers available to write have not been read, the system is characterized as full. Consequently, once the "removed" signal comes to the writer, the system is no longer full and the writer can begin writing another data cell into the buffer entry section.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A data buffer, the data buffer comprising:
   an entry section, the entry section comprising a buffer entry section; and a signaling circuit coupled to the entry section for providing a signal to transfer a portion of a data cell from the entry section prior to the data cell being completely received by the entry section, the signal being provided once an amount of data received by the entry section reaches a predetermined threshold, the predetermined threshold being sufficient to ensure that reading of the data cell cannot get ahead of the writing of the data cell;

the signaling circuit providing a write signal to the entry section to begin writing another data cell into the entry section prior to the data cell being completely read in the entry section, the signal being provided based on a second predetermined threshold, the signaling circuit comprising an asynchronous signaling circuit;

wherein the buffer entry section comprises a write element and a read element, wherein the write element and the read element each comprise an entry pointer, an item pointer and an entry counter.

2. The data buffer of claim 1 wherein the asynchronous signaling circuit comprises an add signaling portion and a remove signaling portion.

3. A data buffer, the data buffer comprising:

an entry section including a buffer entry section, the buffer entry section comprising a write element and a read element, the write element and the read element each comprising an entry pointer, an item pointer and an entry counter; and a signaling circuit coupled to the entry section for providing a signal to transfer a portion of a data cell from the entry section prior to the data cell being completely received by the entry section, the signal circuit comprising an asynchronous signaling circuit including an add signaling portion and a remove signaling portion;

wherein the signal is provided once the amount of data received by the entry section reaches a predetermined threshold, the predetermined threshold being sufficient to ensure that reading of the data cell cannot get ahead of the writing of the data cell; and wherein the asynchronous signaling circuit provides a write signal to the write element to begin writing another data cell into the buffer entry section prior to the data cell being completely read from the buffer entry section wherein the signal is provided based on a second predetermined threshold.

4. A data buffer for buffering a data cell, the data buffer comprising:

a buffer entry section including a write element and a read element, wherein the write element and the read element each comprise an entry pointer, an item pointer and an entry counter; and an asynchronous signaling circuit coupled to the buffer entry section, wherein the asynchronous signaling circuit provides a first signal to the read element to transfer data from the buffer entry section prior to a data cell being completely received by the buffer entry section wherein the first signal is provided once the amount of data received by the buffer entry section reaches a predetermined threshold, the predetermined threshold being sufficient to ensure that reading of the data cell cannot get ahead of the writing of the data cell;

wherein the asynchronous signaling circuit provides a write signal to the write element to begin writing another data cell into the buffer entry section prior to the data cell being completely read from the read element and wherein the signal is provided based on a second predetermined threshold.

5. The data buffer of claim 4 wherein the asynchronous signaling circuit comprises an add signaling portion and a remove signaling portion.

6. A data buffer for buffering a data cell, the data buffer comprising:

a buffer entry section including a write element and a read element, wherein the write element and the read element each comprise an entry pointer, an item pointer and an entry counter; and an asynchronous signaling circuit coupled to the buffer entry section, wherein the asynchronous signaling circuit provides a first signal to the read element to transfer data from the buffer entry section prior to a data cell being completely received by the buffer entry section, the asynchronous signaling circuit including an add signaling portion and a remove signaling portion wherein the first signal is provided once the amount of data received by the buffer entry section reaches a predetermined threshold, the predetermined threshold being sufficient to ensure that reading of the data cell cannot get ahead of the writing of the data cell;

wherein the asynchronous signaling circuit provides a second signal to the write element to begin writing another data cell into the buffer entry section prior to the data cell being completely read from the buffer entry section wherein the second signal is provided once the amount of data received by the buffer entry section reaches a second predetermined threshold.

7. A data buffer for buffering a data cell, the data buffer comprising:

a buffer entry section including a write element and a read element, wherein the write element and the read element each comprise an entry pointer, an entry counter and an item pointer; and an asynchronous signaling circuit coupled to the buffer entry section, the asynchronous signaling circuit comprising an add signaling portion and a remove signaling portion, wherein the asynchronous signaling circuit provides a first signal to the read element prior to the data cell being completely written into the buffer entry section and a second signal to the write element prior to the data cell being completely read from the buffer entry section, wherein the first signal is provided once the amount of data received by the buffer entry section reaches a predetermined threshold, the predetermined threshold being sufficient to ensure that reading of the data cell cannot get ahead of the writing of the data cell, and the second signal is provided once the amount of data read from the buffer entry section reaches a second predetermined threshold.

8. A method of transferring data in a data buffer, the method comprising the steps of:

allowing a data cell to begin being written into the data buffer;

reading the data cell from the data buffer prior to the data cell being completely written into the data buffer, the reading step commencing reading the data cell based upon an amount of data written into the data buffer reaching a predetermined threshold, the predetermined threshold being sufficient to ensure that reading of the data cell cannot get ahead of the writing of the data cell, the reading in step providing a write signal for a subsequent data cell based upon a second predetermined threshold being reached; and allowing another data cell to begin being written into the data buffer prior to the data cell being completely read out of the data buffer;

wherein the data cell comprises a plurality of portions and the data buffer comprises a buffer entry section including a write element and a read element and an asynchronous signaling circuit coupled to the buffer entry section, the asynchronous signaling circuit comprising an add signaling portion and a remove signaling portion;

wherein the write element comprises a first entry pointer, a first item pointer, and a first entry counter and the read element comprises a second entry pointer, a second item pointer and a second entry counter.

9. The method of claim 8 wherein the step of allowing a data cell to begin being written into the data buffer further comprises:

allowing the write element to write each of the plurality of data cell portions to the buffer entry section via an access to the buffer entry section;

incrementing the first item pointer each time the buffer entry section is accessed; and allowing the asynchronous signaling circuit to provide a signal to the read element once the first item pointer reaches the predetermined threshold.

10. The method of claim 9 wherein the signal of the asynchronous signaling circuit allowing step comprises an add signal.

11. The method of claim 10 wherein the step of allowing a data cell to begin being written into the data buffer further comprises:

incrementing the second entry counter.

12. A method of transferring data in a data buffer, the method comprising the steps of:

allowing a data cell to begin being written into the data buffer, the data cell including a plurality of portions, the data buffer including a buffer entry section and an asynchronous signaling circuit coupled to the buffer entry section, the buffer entry section including a write element and a read element, the asynchronous signaling circuit including an add signaling portion and a remove signaling portion, the write element including a first entry pointer, a first item pointer, and a first entry counter and the read element comprises a second entry pointer, a second item pointer and a second entry counter;

reading the data cell from the data buffer prior to the data cell being completely written into the data buffer, wherein the data cell reading step further comprises:

allowing the read element to receive a signal from the asynchronous signaling circuit, the signal being provided once an amount of data received by the data buffer reaches a predetermined threshold, the predetermined threshold being sufficient to ensure that reading of the data cell cannot get ahead of the writing of the data cell;

allowing the read element to read each of the plurality of data cell portions from the buffer entry section via an access to the buffer entry section;

incrementing the second item pointer each time the buffer entry section is accessed; and allowing the asynchronous signaling circuit to provide a signal to the write inter reaches a second predetermined threshold; and allowing another data cell to begin being written into the data buffer prior to the data cell being completely read out of the data buffer.

13. The method of claim 12 further comprising:

decrementing the first entry counter.

14. The method of claim 13 wherein the signal of the step allowing the read element to receive the signal comprises an add signal and the signal of the step allowing the asynchronous signaling circuit to provide a signal to the write element once the second item pointer reaches a second predetermined threshold comprises a remove signal.

* * * * *

UNITED STATES PATENT AND TRADEMARK OFFICE
CERTIFICATE OF CORRECTION

PATENT NO. : 6,876,664 B1
APPLICATION NO. : 09/541773
DATED : April 5, 2005
INVENTOR(S) : Bullis et al.

It is certified that error appears in the above-identified patent and that said Letters Patent is hereby corrected as shown below:

On The Title Page:
Abstract

Item (57), line 8, delete "Firsts" and replace with --First--.

Column 8

Line 23, after "write" and before "reaches", delete "inter" and replace with --element once the second item pointer--.

Signed and Sealed this

Twenty-fifth Day of July, 2006

JON W. DUDAS
*Director of the United States Patent and Trademark Office*